(12) United States Patent
    Wang et al.

(10) Patent No.: US 10,931,779 B2
(45) Date of Patent: Feb. 23, 2021

(54) SYSTEMS AND METHODS FOR DATA PROCESSING

(71) Applicant: BEIJING VOYAGER TECHNOLOGY CO., LTD., Beijing (CN)

(72) Inventors: Fenglei Wang, Beijing (CN); Lingang Min, Beijing (CN)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/908,781

(22) Filed: Jun. 23, 2020

(65) Prior Publication Data
    US 2020/0396309 A1     Dec. 17, 2020

Related U.S. Application Data

(63) Continuation of application No. PCT/CN2019/091477, filed on Jun. 17, 2019.

(51) Int. Cl.
    *H04L 29/08*     (2006.01)
    *G06F 9/54*      (2006.01)
    (Continued)

(52) U.S. Cl.
    CPC ........ *H04L 67/2842* (2013.01); *G06F 8/4442* (2013.01); *G06F 9/3802* (2013.01);
    (Continued)

(58) Field of Classification Search
    CPC ........... H04L 67/2842; H04L 67/1097; H04W 8/082; G06F 9/3802; G06F 9/383;
    (Continued)

(56) References Cited

U.S. PATENT DOCUMENTS

| 2005/0154770 | A1  | 7/2005 | Nishikawa et al. |
| 2013/0198201 | A1* | 8/2013 | Fukuda ............... G06N 5/025 |
|              |     |        |                    707/741 |

(Continued)

FOREIGN PATENT DOCUMENTS

| CN | 106506704 A | 3/2017 |
| CN | 104967651 B | 6/2017 |

OTHER PUBLICATIONS

International Search Report in PCT/CN2019/091477 dated Mar. 17, 2020, 4 pages.

(Continued)

*Primary Examiner* — Michael A Keller
(74) *Attorney, Agent, or Firm* — Metis IP LLC

(57) ABSTRACT

A method for data processing is provided. The method may include: preprocessing initial data to obtain preprocessed data; storing the preprocessed data; receiving a data request made through an application, the data request including information relating to a storage path of contents that are requested; in response to the data request, determining, by a nearby proxy of a first proxy cluster in a first region, whether the contents requested in the data request are cached locally; and in response to a determination that the contents are cached locally, providing, by the nearby proxy, the contents to the application; or in response to a determination that the contents are not cached locally, acquiring, by the nearby proxy, the contents based on the information relating to the storage path of the contents; and providing, by the nearby proxy, the contents to the application.

20 Claims, 9 Drawing Sheets

(51) Int. Cl.
  *G06F 9/48* (2006.01)
  *G06F 8/41* (2018.01)
  *G06F 16/172* (2019.01)
  *G06F 9/38* (2018.01)
  *G06F 12/0862* (2016.01)
  *G06F 12/1027* (2016.01)
  *H04W 8/08* (2009.01)

(52) U.S. Cl.
  CPC ............ *G06F 9/383* (2013.01); *G06F 9/4881* (2013.01); *G06F 9/542* (2013.01); *G06F 12/0862* (2013.01); *G06F 12/1027* (2013.01); *G06F 16/172* (2019.01); *H04L 67/1097* (2013.01); *H04W 8/082* (2013.01)

(58) Field of Classification Search
  CPC ............. G06F 12/0862; G06F 12/1027; G06F 16/172; G06F 8/4442; G06F 9/4881; G06F 9/542
  See application file for complete search history.

(56) References Cited

U.S. PATENT DOCUMENTS

| | | | | |
|---|---|---|---|---|
| 2014/0324738 A1* | 10/2014 | Pr | ......................... | G06F 16/248 706/11 |
| 2018/0352091 A1* | 12/2018 | Puri | .................... | H04M 7/0036 |
| 2020/0036810 A1* | 1/2020 | Howard | ................ | G06N 5/022 |

OTHER PUBLICATIONS

Written Opinion in PCT/CN2019/091477 dated Mar. 17, 2020, 4 pages.

\* cited by examiner

SYSTEMS AND METHODS FOR DATA PROCESSING

CROSS-REFERENCE TO RELATED APPLICATIONS

This application is a Continuation of International Application No. PCT/CN2019/091477, filed on Jun. 17, 2019, the entire contents of which are hereby incorporated by reference.

TECHNICAL FIELD

The present disclosure generally relates to information technology, and in particular, to systems and methods for data processing.

BACKGROUND

Data processing technologies are widely used in various fields. For example, in a system for the testing of autonomous driving, an autonomous vehicle can generate a large amount of data (e.g., bag files) every day in different regions (e.g., different countries and/or different districts in a country). Researchers in different regions may need to access and/or analyze large amount of data frequently and/or cross regions. It would be crucial, therefore, to preprocess, manage and/or transfer such data timely and efficiently. In addition, it would be preferable to save resources (e.g., bandwidths) in the process. In some occasions, a data processing system can preprocess and store the data in a database (e.g., a Hadoop Distributed File System (HDFS)). A user (e.g., an engineer) may retrieve and/or download the data from the database. However, the bandwidths across regions are not only limited with slow transmission speed but also expensive. In-depth exploration of autonomous driving relies on fast communication of the data. Therefore, it is desirable to provide methods and systems for efficient and cost-effective data processing, and without waste of resources.

SUMMARY

According to one aspect of the present disclosure, a method for data processing is provided. The method may include one or more of the following operations: preprocessing initial data to obtain preprocessed data; storing the preprocessed data; receiving a data request made through an application, the data request including information relating to a storage path of contents that are requested, wherein the contents may be part of the preprocessed data; in response to the data request, determining, by a nearby proxy of a first proxy cluster in a first region, whether the contents requested in the data request are cached locally in a server of the nearby proxy or in servers of the first proxy cluster; and in response to a determination that the contents are cached locally in the server of the nearby proxy or in the servers of the first proxy cluster, providing, by the nearby proxy, the contents to the application; or in response to a determination that the contents are not cached locally in the server of the nearby proxy or in the servers of the first proxy cluster, acquiring, by the nearby proxy, the contents based on the information relating to the storage path of the contents; and providing, by the nearby proxy, the contents to the application.

In some embodiments, in response to a determination that the contents are not cached locally, the method may further include: determining, by the nearby proxy, whether the contents requested in the data request are hot data; and in response to a determination that the contents are hot data, caching the contents in one or more servers coupled to other proxies of the first proxy cluster.

In some embodiments, in response to a determination that the contents are not cached locally, the method may further include: determining, by the nearby proxy, whether the contents requested in the data request are hot data; and in response to a determination that the contents are hot data, caching the content in one or more servers coupled to other proxies of a second proxy cluster in the first region and/or in a second region.

In some embodiments, the acquiring, by the nearby proxy, the contents based on the information relating to the storage path of the contents may include: upon the storage path of the content directing to a second region, requesting, by the nearby proxy, the second proxy cluster in the second region to return the contents; and caching, by the nearby proxy, the contents locally in the server of the nearby proxy or in the servers of the first proxy cluster.

In some embodiments, the method may further include caching hot preprocessed data in one or more servers coupled to one or more proxies of one or more proxy clusters.

In some embodiments, the preprocessing initial data to obtain preprocessed data may include preprocessing the initial data stored in a distributed file sub-system.

In some embodiments, the distributed file sub-system may be a Hadoop distributed file system (HDFS).

In some embodiments, the preprocessing initial data to obtain preprocessed data may include preprocessing the initial data based on a task queue.

In some embodiments, the task queue may be a distributed task queue.

In some embodiments, the preprocessing the initial data based on a task queue may include pushing a plurality of tasks associated with the preprocessing of the initial data into the task queue based on priorities of the plurality of tasks; popping one or more tasks from the task queue based on the priorities of the plurality of tasks; and obtaining preprocessed data by executing the one or more tasks.

In some embodiments, the preprocessing the initial data based on a task queue may further include initiating one or more notifications relating to execution results of the one or more tasks to the application.

In some embodiments, the preprocessing the initial data based on a task queue may further include storing the preprocessed data in the task queue.

In some embodiments, the storing the preprocessed data may include: obtaining, by one or more proxies, the preprocessed data from the task queue; and storing, by the one or more proxies, the preprocessed data into a distributed file sub-system.

In some embodiments, the preprocessing of the initial data may include at least one of verifying a validity of the initial data, filtering the initial data, segmenting the initial data, or compressing the initial data.

In some embodiments, the method may further include determining the nearby proxy of the first proxy cluster in the first region based on the data request.

According to another aspect of the present disclosure, a system for data processing is provided. The system may include at least one storage medium including a set of instructions; and at least one processor in communication with the at least one storage medium, wherein when executing the set of instructions, the at least one processor is configured to cause the system to perform the method for data processing.

According to another aspect of the present disclosure, a system for data processing is provided. The system may include a plurality of servers; and one or more proxies in one or more proxy clusters. The plurality of servers may be configured to preprocess initial data to obtain preprocessed data. The one or more proxies may be configured to: store the preprocessed data; receive a data request made through an application, the data request including information relating to a storage path of contents that are requested, wherein the contents may be part of the preprocessed data; determine a nearby proxy of a first proxy cluster of the one or more proxy clusters based on the data request; in response to the data request, determining, whether the contents requested in the data request are cached locally in a server of the nearby proxy or in servers of the first proxy cluster; and in response to a determination that the contents are cached locally in the server of the nearby proxy or in the servers of the first proxy cluster, provide the contents to the application; or in response to a determination that the contents are not cached locally in the server of the nearby proxy or in the servers of the first proxy cluster, acquire the contents based on the information relating to the storage path of the contents; and provide the contents to the application.

According to another aspect of the present disclosure, a non-transitory computer readable medium for data processing is provided. The non-transitory computer readable medium may include at least one set of instructions for data processing, wherein when executed by one or more processors of a computing device, the at least one set of instructions causes the computing device to perform one or more of the following operations: causing a plurality of servers to preprocess initial data to obtain preprocessed data; causing one or more proxies in one or more proxy clusters to store the preprocessed data; receiving a data request made through an application, the data request including information relating to a storage path of contents that are requested, wherein the contents may be part of the preprocessed data; in response to the data request, determining a nearby proxy of a first proxy cluster of the one or more proxy clusters based on the data request; causing the nearby proxy to determine whether the contents requested in the data request are cached locally in a server of the nearby proxy or in servers of the first proxy cluster; and in response to a determination that the contents are cached locally in the server of the nearby proxy or in the servers of the first proxy cluster, causing the nearby proxy to provide the contents to the application; or in response to a determination that the contents are not cached locally in the server of the nearby proxy or in the servers of the first proxy cluster, causing the nearby proxy to acquire the contents based on the information relating to the storage path of the contents; and causing the nearby proxy to provide the contents to the application.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
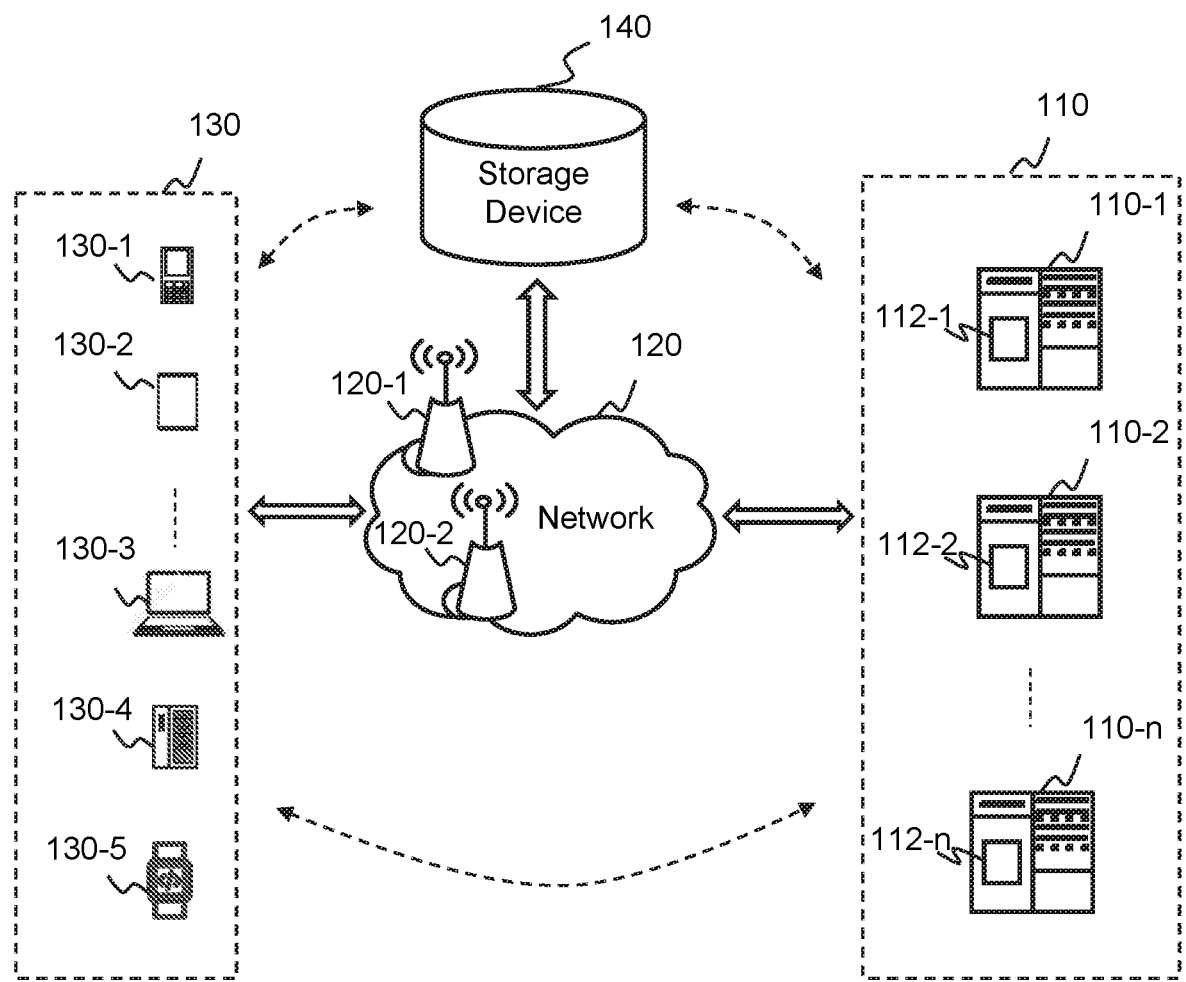
FIG. 1 is a schematic diagram illustrating an exemplary data processing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding processing and/or management of data generated in a transportation system in land, it should be understood that this is only one exemplary embodiment. The systems and methods of the present disclosure may be applied to any other kind of transportation system or any other online to offline (O2O) service system. For example, the systems and methods of the present disclosure may be applied to transportation systems of different environments including ocean, aerospace, or the like, or any combination thereof. The vehicle of the transportation systems may include a car, a bus, a train, a subway, a vessel, an aircraft, a spaceship, a hot-air balloon, or the like, or any combination thereof.

An aspect of the present disclosure relates to systems and methods for data processing. According to some systems and methods of the present disclosure, a preprocessing server cluster may receive a request for preprocessing initial data; push a plurality of tasks associated with the preprocessing of the initial data into a task queue based on priorities of the plurality of tasks; pop one or more tasks from the task queue based on the priorities of the plurality of tasks; obtain the initial data from one or more proxy clusters; obtain preprocessed data by executing the one or more tasks; initiate one or more notifications relating to execution results of the one or more tasks to an application. According to some systems and methods of the present disclosure, a proxy server cluster may receive a data request made through an application; determine whether the contents requested in the data request are cached locally by a nearby proxy (in a server of the nearby proxy or in servers of a proxy cluster that the nearby proxy belongs to); in response to a determination that the contents are cached locally, provide the contents to the application by the nearby proxy; or in response to a determination that the contents are not cached locally, acquire the contents based on information relating to a storage path of the contents by the nearby proxy, and provide the contents to the application by the nearby proxy. Furthermore, according to some systems and methods of the present disclosure, in response to a determination that the contents are not cached locally, the proxy server cluster may determine whether the contents requested in the data request are hot data by a nearby proxy; and in response to the contents are hot data, cache the contents in one or more servers coupled to other proxies in one or more proxy clusters in one or more regions.

According to the systems and methods of the present disclosure, because initial data is preprocessed asynchronously in different regions, users can download the preprocessed data directly, and the amount of data downloaded by the users is reduced, which can improve the data access efficiency, reduce data storage space, and save bandwidth resources. Therefore, large amounts of data generated in different regions may be managed efficiently and cost-effectively without waste of resources. Besides, according to the systems and methods of the present disclosure, data can be cached in one or more servers of one or more regions automatically before or after user requests, and the cache mechanism can be performed based on a hot degree of the data, which can improve the download speed (or access speed) of data, save bandwidth resources, and handle large-scale concurrent data access requests.

FIG. 1 is a schematic diagram illustrating an exemplary data processing system according to some embodiments of the present disclosure. In some embodiments, the data processing system 100 may be applied to one or more fields or industries. Exemplary fields or industries may include autonomous driving industries, medical industries, power industries, communication industries, or any industry with high data concurrency, or the like, or any combination thereof. In some embodiments, the data processing system 100 may include one or more servers 110, a network 120, one or more terminal devices 130, and one or more storage devices 140. The components in the data processing system 100 may be connected in one or more of various ways. Merely by way of example, the storage device 140 may be connected to the server 110 directly (as indicated by the bi-directional arrow in dotted lines linking the storage device 140 and the server 110) or through the network 120. As another example, the server 110 may be connected to the terminal device 130 directly (as indicated by the bi-directional arrow in dotted lines linking the server 110 and the terminal device 130) or through the network 120. As still another example, the terminal device 130 may be connected to the storage device 140 directly (as indicated by the bi-directional arrow in dotted lines linking the terminal device 130 and the storage device 140) or through the network 120.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the terminal device 130 and/or the storage device 140 via the network 120. As another example, the server 110 may be directly connected to the terminal device 130 and/or the storage device 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 in the present disclosure.

In some embodiments, the servers 110 may include one or more servers such as a server 110-1, a server 110-2, . . . , a server 110-n. The servers 110 may be configured to perform one or more functions for storing data, preprocessing data, distributing data, caching data, or the like, or any combination thereof, independently or jointly. Merely by way of example, the servers 110 may include one or more proxy server clusters, one or more preprocessing server clusters, etc. A proxy server cluster may include one or more servers coupled to one or more proxies of the proxy server cluster in a region (e.g., a country or a district in a country). A proxy server cluster may be configured to interact with the storage device(s) 140 (or a database operated by the storage device(s) 140) to obtain data from or store data to the storage device(s) 140 (or the database). In some embodiments, the proxy server cluster may cache data locally (in a server of a nearby proxy or in the proxy server cluster) to facilitate data access and/or ease data access pressure. As used herein, a proxy may refer to a protocol stored in the data processing system 100 (or a server that can perform a function associated with the protocol). In some embodiments, the proxy may be configured to retrieve and/or download and/or store data from/to one or more components (e.g., the server 110, the storage device 140) of the data processing system 100. A preprocessing server cluster may include one or more servers in a region (e.g., a country or a district in a country) for performing functions of preprocessing data.

In some embodiments, different regions (e.g., different countries, or different districts in a country) may have different preprocessing server clusters and/or different proxy server clusters. In some embodiments, different regions (e.g., different districts in a country) may share a same preprocessing server cluster and/or a same proxy server cluster. In some embodiments, all servers in a preprocessing server cluster or a proxy server cluster may be configured in a same region. In some embodiments, one or more servers in a preprocessing server cluster or a proxy server cluster may be configured in different regions. A region may refer to a geographical region or an administrative region. In some embodiments, a server may perform only one function. For example, one of the servers 110 (e.g., the server 110-1) may function as a proxy server, while another of the servers 110 (e.g., the server 110-2) may function as a preprocessing server. In some embodiments, a server may perform two or more functions. For example, one of the servers 110 (e.g., the server 110-n) may function as a proxy server and a preprocessing server.

In some embodiments, one or more (e.g., all) of the servers 110 may be set in an Internet Data Center (IDC). In some embodiments, the servers 110 may be set in different data centers of different regions. As used herein, a data center may refer to a dedicated space configured to house computer systems and associated components, such as telecommunication equipment and storage devices (e.g., the storage device 140). A region may have one or more data centers. The IDC may refer to a data center established by a service provider or IDC company to provide stable and wide-band network services, high performance computing services, and/or hosting services. In some embodiments, a portion of the servers 110 may be set in an IDC, while another portion of the servers 110 may be set outside the IDC (e.g., in one or more test stations, in one or more offices, etc.). In some embodiments, the servers 110 may control or manage the operations of the computing device(s) and/or the storage device(s) in the IDC, test stations, and/or offices.

In some embodiments, the servers 110 may include one or more processing devices 112. As shown in FIG. 1, the server 110-1 may include a processing device 112-1, the server 110-2 may include a processing device 112-2, . . . , and the server 110-n may include a processing device 112-n. The processing devices 112 may process information and/or data stored in the storage devices (e.g., the storage device 140) and/or generated by the terminal device 130 to perform one or more functions described in the present disclosure. For example, the processing devices 112 may preprocess initial data to obtain preprocessed data. As another example, in response to a data request made through an application, the processing devices 112 may determine, by a nearby proxy of a first proxy cluster in a first region, whether contents requested in the data request are cached locally (in a server of the nearby proxy or servers of the first proxy cluster). As still another example, the processing devices 112 may provide, by the nearby proxy, the contents to the application in response to a determination that the contents are cached locally. As still another example, the processing devices 112 may acquire, by the nearby proxy, the contents based on information relating to a storage path of the contents. As still another example, the processing devices 112 may determine, by the nearby proxy, whether the contents requested in the data request are hot data. As still another example, the processing devices 112 may cache the contents in one or more servers coupled to other proxies of the first proxy cluster and/or in one or more servers coupled to proxies of a second proxy cluster in the first region and/or in a second region. In some embodiments, the processing devices 112 may include one or more processing engines (e.g., single-core processing engine(s) or multi-core processor(s)). Merely by way of example, the processing devices 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, at least a portion of the servers 110 may be connected to the network 120 to communicate with one or more components (e.g., the terminal device 130, the storage device 140) of the data processing system 100. In some embodiments, at least a portion of the servers 110 may be directly connected to or communicate with one or more components (e.g., the terminal device 130, the storage device 140) of the data processing system 100.

The network 120 may facilitate exchange of information and/or data. In some embodiments, one or more components (e.g., the server 110, the terminal device 130, or the storage device 140) of the data processing system 100 may send information and/or data to other component(s) of the data processing system 100 via the network 120. For example, the terminal device 130 may transmit a data request to the server 110 via the network 120. As another example, the processing device 112 may receive a data request transmitted by the terminal device 130 via the network 120. As still another example, the processing device 112 may obtain initial data for preprocessing from the storage device 140 via the network 120. As still another example, the storage device 140 may obtain preprocessed data for storing from the server 110 via the network 120. As still another example, the processing device 112 may receive a request for preprocessing the initial data from the terminal device 130 via the network 120. As still another example, the processing device 112 may send one or more notifications relating to preprocessed results of the initial data to the terminal device 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points, through which one or more components of the data processing system 100 may be connected to the network 120 to exchange data and/or information.

In some embodiments, the terminal device(s) 130 may include a mobile device 130-1, a tablet computer 130-2, a laptop computer 130-3, a built-in device in a vehicle 130-4, a wearable device 130-5, or the like, or any combination thereof. In some embodiments, the mobile device 130-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift™, a HoloLens™, a Gear VR™, etc. In some embodiments, the built-in device in the vehicle 130-4 may include an onboard computer, an onboard television, etc. In some embodiments, the wearable device 130-5 may include a smart bracelet, a smart footgear, smart glasses, a smart helmet, a smart watch, smart clothing, a smart backpack, a smart accessory, or the like, or any combination thereof. In some embodiments, the server 110 may be integrated into the terminal device(s) 130.

The terminal device(s) 130 may be configured to facilitate communications between a user (e.g., an engineer) and the data processing system 100. For example, the user may send a data request via the terminal device 130 to the data processing system 100. As another example, the user may retrieve and/or download data and/or information stored in one or more storage devices of the data processing system 100 via the terminal device 130. As still another example, the user may retrieve or download data of interest by logging in an application coupled with (or that can communicate with) the data processing system 100 via the terminal device 130. In some embodiments, the application coupled with the data processing system 100 may facilitate the processing and/or management of data generated by the terminal device 130 and/or stored in the storage device 140. In some embodiments, the application may provide a data access interface for one or more users of the data, so that the user(s) may retrieve or download data of interest via the application for further use of the data. More descriptions of the application may be found elsewhere in the present disclosure.

The storage device 140 may store data and/or instructions. In some embodiments, the storage device 140 may store data obtained from the terminal device 130, such as a data request. In some embodiments, the storage device 140 may store initial data. For illustration, taking autonomous driving industries as an example, the storage device 140 may store initial data obtained from an autonomous vehicle, such as driving information. The driving information associated with the autonomous vehicle may include road condition information (e.g., a road width, a road length, a road type, a traffic sign, traffic lane information, traffic light information), map information, a state (e.g., operation information, performance information) of the autonomous vehicle during driving (e.g., a location of the autonomous vehicle, a velocity (e.g., an instantaneous velocity, an average velocity within a predetermined time period) of the autonomous vehicle, an acceleration (e.g., an instantaneous acceleration, an average acceleration within a predetermined time period) of the autonomous vehicle, a driving path of the autonomous vehicle, or the like, or any combination thereof. For example, the driving information may include, e.g., point-cloud data, image data, velocity data, location data associated with the autonomous vehicle acquired by a plurality of detection units (e.g., a light detection and ranging (LiDAR), a camera, a velocity sensor, a global position system (GPS) module), performance or operation information of the autonomous vehicle. In some embodiments, the storage device 140 may store data generated or processed by the server 110. For example, the server 110 may preprocess the initial data to obtain preprocessed data, and the storage device 140 may store the preprocessed data. In some embodiments, the storage device 140 may store data and/or instructions that the server 110 may execute or use to perform exemplary methods described in the present disclosure.

In some embodiments, the storage device 140 may be connected to the network 120 to communicate with one or more components (e.g., the server 110, terminal device 130) of the data processing system 100. One or more components of the data processing system 100 may access the data or instructions stored in the storage device 140 via the network 120. In some embodiments, the storage device 140 may be directly connected to or communicate with one or more components (e.g., the server 110, the terminal device 130) of the data processing system 100. In some embodiments, at least a portion of the storage device 140 may be part of the server 110. In some embodiments, at least a portion of the storage device 140 may be integrated in the terminal device 130. In some embodiments, at least a portion of the storage devices 140 may be set in one or more IDCs. Merely for illustration, only one storage device is illustrated in the data processing system 100. However, it should be noted that the data processing system 100 in the present disclosure may also include multiple storage devices.

In some embodiments, the data stored in the storage device 140 may be organized in a database (e.g., a distributed file sub-system), an information source, or the like, or any combination thereof. The database may facilitate the storage and retrieve of the data. The distributed file sub-system may include a Hadoop Distributed File System (HDFS), a Network File System (NFS), a KASS File System (KASS), an Andrew File System (AFS), or the like, or any combination thereof. Taking the HDFS as an example, initial data and/or preprocessed data may be stored in the HDFS for retrieving. The HDFS may communicate with one or more components (e.g., the server 110, the terminal device 130) of the data processing system 100 via the network 120 or directly communicate with the one or more components (e.g., the server 110, the terminal device 130) of the data processing system 100. In some embodiments, the database (e.g., a Hadoop Distributed File System (HDFS) may be a part of (or operated by) the storage device 140. In some embodiments, the data processing system 100 may include one or more HDFSs. For example, different regions (e.g., different countries) may have different HDFSs. As another example, different regions (e.g., different districts in a country) may share a same HDFS.

In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

It should be noted that the data processing system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the data processing system 100 may be implemented on other devices to realize similar or different functions. As another example, the storage device 140 may be omitted from the data processing system 100.

Figure 2:
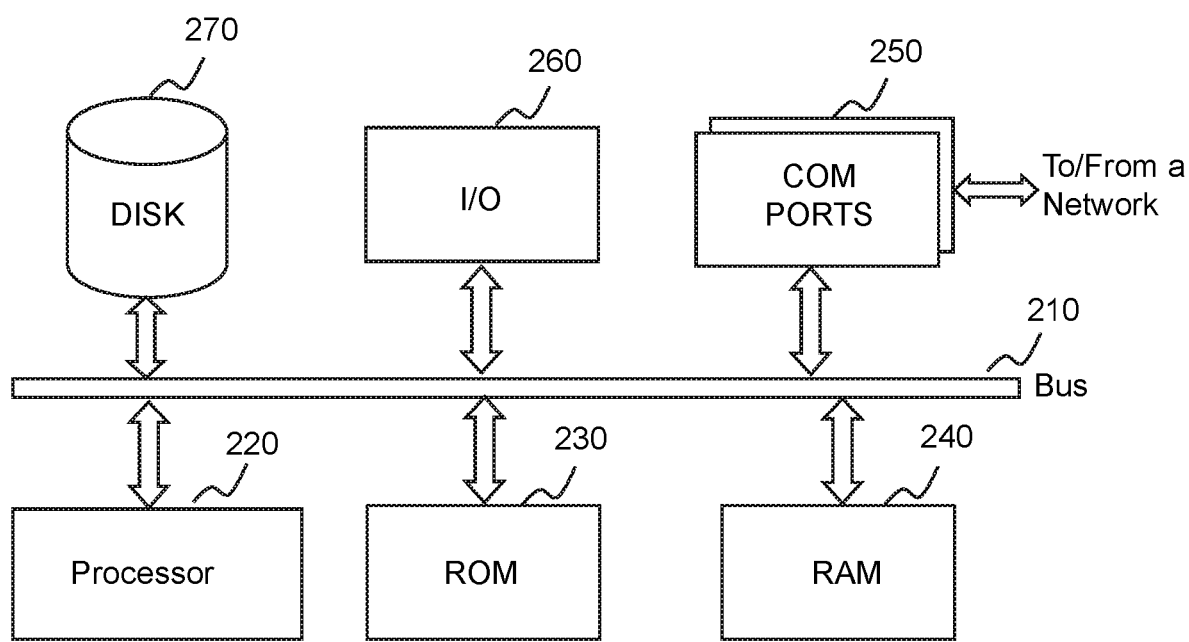
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the data processing system 100 of the present disclosure. For example, the processing device 112 of the data processing system 100 may be implemented on the computing device 200, via its hardware, software program, firmware, or a combination thereof. Although only one such computer is shown for convenience, the computer functions related to the data processing system 100 as described herein may be implemented in a distributed manner on a number of similar platforms to distribute the processing load.

The computing device 200, for example, may include communication (COM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read only memory (ROM) 230, or a random access memory (RAM) 240, for storing various data files to be processed and/or transmitted by the computing device 200. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As in another example, operation A and operation B may also be performed by two different processors jointly or separately in the computing device 200 (e.g., the first processor executes operation A and the second processor executes operation B, or the first and second processors jointly execute operations A and B).

Figure 3:
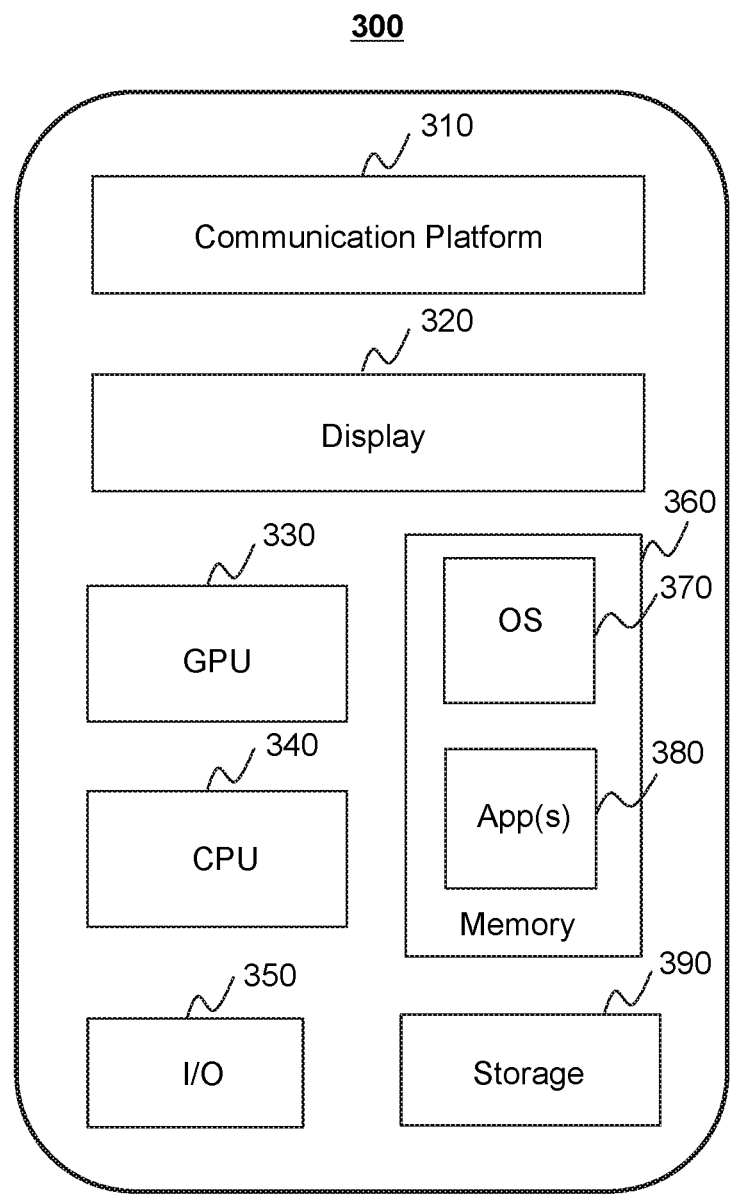
FIG. 3 is a block diagram illustrating an exemplary processing device according to some embodiments of the present disclosure.

FIG. 3 is a schematic diagram illustrating exemplary hardware and/or software components of an exemplary mobile device on which a terminal device may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to positioning or other information from the processing device 112. User interactions with the information stream may be achieved via the I/O 350 and provided to the processing device 112 and/or other components of the data processing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
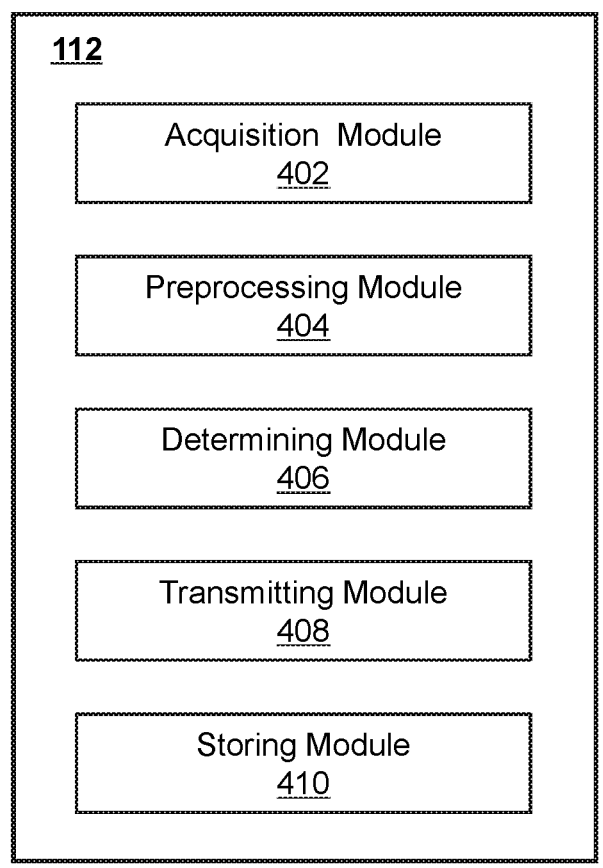
FIG. 4 is a block diagram illustrating an exemplary processing device according to some embodiments of the present disclosure.

FIG. 4 is a block diagram illustrating an exemplary processing device according to some embodiments of the present disclosure. The processing device 112 of the server 110 may include an acquisition module 402, a preprocessing module 404, a determining module 406, a transmitting module 408, and a storing module 410.

The acquisition module 402 may be configured to acquire contents in response to a data request. In some embodiments, the data request may include information relating to a storage path of the contents and/or a description of the contents that are requested. The acquisition module 402 may acquire the contents based on the information of the storage path of the content by a nearby proxy. More descriptions of the acquisition of the contents may be found elsewhere in the present disclosure (e.g., operation 509 in FIG. 5 and the descriptions thereof).

The preprocessing module 404 may be configured to preprocess initial data to obtain preprocessed data. In some embodiments, the preprocessing module 404 may preprocess the initial data by performing one or more preprocessing operations on the initial data. In some embodiments, the preprocessing module 404 may preprocess the initial data based on preset rules or requests of a user. In some embodiments, the preprocessing module 404 may preprocess the initial data based on a task queue. More descriptions of the preprocessing of the initial data may be found elsewhere in the present disclosure (e.g., operation 501 in FIG. 5, operations 601-607 in FIG. 6, FIG. 9 and the descriptions thereof).

The determining module 406 may be configured to determine whether the contents requested in the data request are cached locally. In some embodiments, the determining module 406 may determine a nearby proxy in response to the data request. The nearby proxy may determine information (e.g., types, names, storage paths, sizes, or the like) associated with the contents. The nearby proxy may determine whether the contents requested in the data request are cached locally (e.g., in a server of the nearby proxy or servers of a proxy cluster that the nearby proxy belongs to) based on the information. More descriptions of the determination of whether the contents are cached locally may be found elsewhere in the present disclosure (e.g., operation 507 in FIG. 5, operation 807 in FIG. 8 and the descriptions thereof). In some embodiments, the determining module 406 may determine whether the contents requested in the data request are hot data (as illustrated in operation 811 of FIG. 8).

The transmitting module 408 may be configured to facilitate communications between one or more components of the data processing system 100. For example, the transmitting module 408 may receive the data request made through an application. The application may include an interface of the data processing system 100 to facilitate data access in the data processing system 100 for one or more users. User(s) can access the data processing system 100 through the interface. As another example, the transmitting module 408 may provide the contents to the application. The user may access or download the contents through the application. More descriptions of the receiving of the data request and the providing of the contents may be found elsewhere in the present disclosure (e.g., operations 505, 511 in FIG. 5 and the descriptions thereof).

The storing module 410 may be configured to store the preprocessed data. In some embodiments, the storing module 410 may store, by one or more proxies, the preprocessed data into one or more storage devices (e.g., the storage device 140, a HDFS operated by the storage device 140) of the data processing system 100. In some embodiments, the storing module 410 may obtain the preprocessed data from a task queue by one or more proxies. More descriptions of the storing of the preprocessed data may be found elsewhere in the present disclosure (e.g., operation 503 in FIG. 5, operations 611-613 in FIG. 6 and the descriptions thereof).

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units or be omitted. For example, the preprocessing module 404 may be divided into three units (e.g., a first unit, a second unit, and a third unit). The first unit may push a plurality of tasks into a task queue. The second unit may pop one or more tasks from the task queue. The third unit may execute the tasks, obtain preprocessed data, and store the preprocessed data in the task queue.

Figure 5:
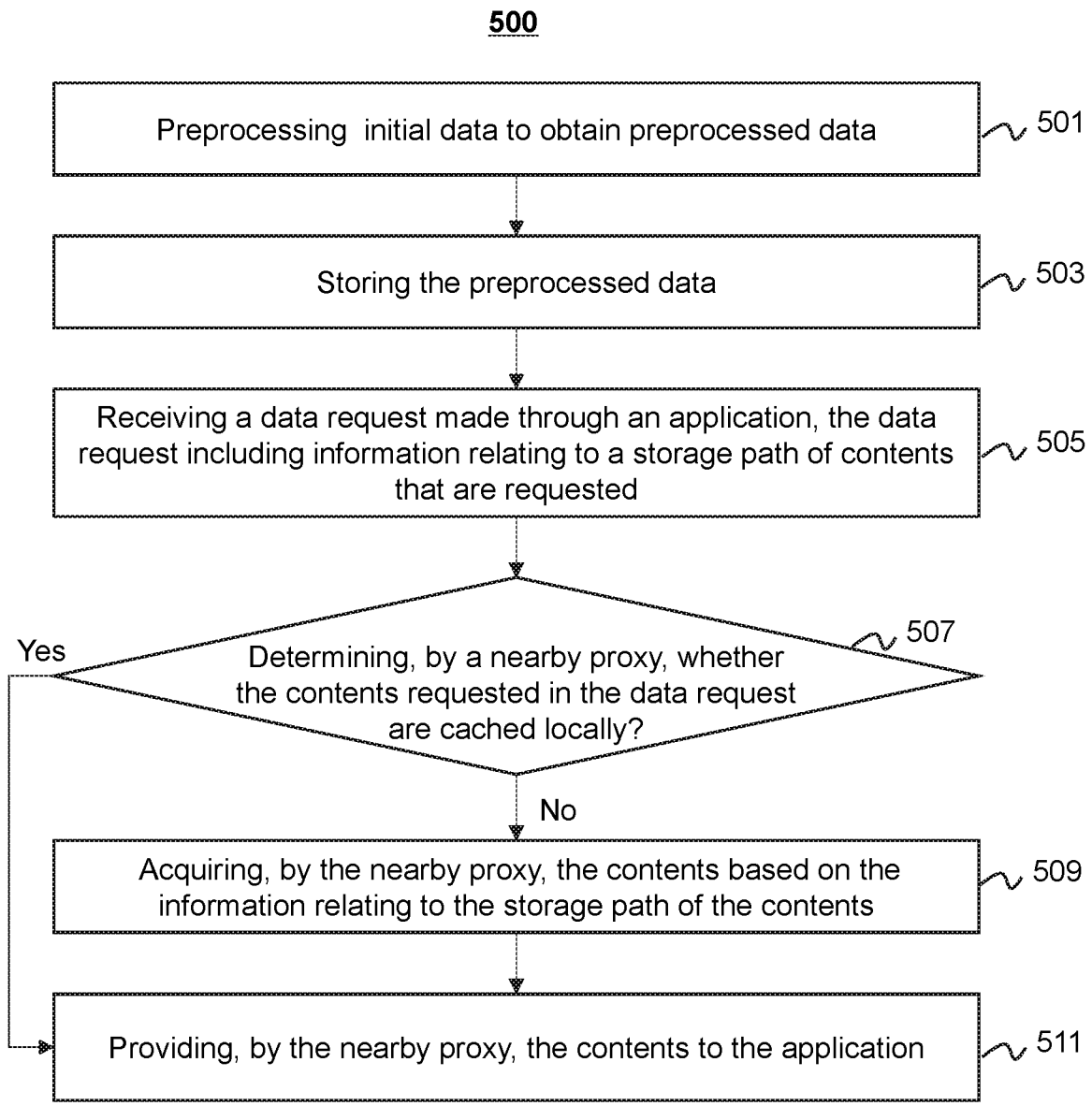
FIG. 5 is a flowchart illustrating an exemplary process for providing contents to an application in response to a data request made through the application according to some embodiments of the present disclosure.

FIG. 5 is a flowchart illustrating an exemplary process for providing contents to an application in response to a data request made through the application according to some embodiments of the present disclosure. The process 500 may be executed by the data processing system 100. For example, the process 500 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting.

In 501, the processing device(s) 112 (e.g., the preprocessing module 404) may preprocess initial data to obtain preprocessed data.

In some embodiments, the initial data may refer to raw data that stored in the storage devices (e.g., the storage device 140, or a HDFS operated by the storage device 140) of the data processing system 100. Taking autonomous driving industries as an example, the initial data may be obtained from or be associated with one or more autonomous vehicles. In some embodiments, the initial data may include driving information (e.g., point-cloud data, image data, velocity data, location data) associated with the autonomous vehicles acquired by a plurality of detection units (e.g., a light detection and ranging (LiDAR), a camera, a velocity sensor, a global position system (GPS) module), performance or operation information (e.g., a driving path) of the autonomous vehicles, or the like, or any combination thereof.

In some embodiments, the processing device(s) 112 may preprocess the initial data by performing one or more preprocessing operations on the initial data. The preprocessing operations may include compressing the initial data, verifying the initial data, filtering the initial data, segmenting the initial data, or the like, or any combination thereof. In some embodiments, the processing device(s) 112 may preprocess the initial data based on one or more preset rules. For example, the processing device(s) 112 may preprocess the initial data based on one or more preset algorithms and/or parameters. In some embodiments, the processing device(s) 112 may preprocess the initial data based on one or more requests of a user (e.g., an engineer). For example, a user may send one or more preprocessing requests (or instructions) with specific requirements (e.g., requesting for filtering a first data set of the initial data and compressing a second data set of the initial data) via the network 120 to the data processing system 100, and the processing device(s) may preprocess the initial data based on the requirements.

The compressing the initial data may include reducing a storage space of the initial data for improving a transmission, storage, and/or processing efficiency. In some embodiments, the processing device(s) 112 may compress the initial data based on a compression algorithm (e.g., a Huffman algorithm, a Lempel-Ziv-Welch (LZW) algorithm, a Lempel-Ziv-Storer-Szymanski (LZSS) algorithm, a Deflate algorithm, a Run Length Coding (RLC) algorithm, a Run Length Encoding (RLE) algorithm, a Lempel-Ziv (LZ77) algorithm, a Rice Coding algorithm, etc.). In some embodiments, the compressing the initial data may include removing abnormal data (e.g., duplicated data, redundant data, or error data) from the initial data. For example, during data collections, an error may occur (e.g., the data collected may be 0 or blank). The processing device(s) 112 may remove the error data (e.g., 0 or blank). As another example, the processing device(s) 112 may remove data that is collected during a collection device (e.g., an unmanned aerial vehicle) failure. In some embodiments, the abnormal data may include identifiers. The processing device(s) 112 may identify the abnormal data based on the identifiers thereof and remove the abnormal data.

The verifying the initial data may include determining a validity of the initial data. In some embodiments, the processing device(s) 112 may verify the initial data based on a time sequence of the initial data or one or more other preset rules. For example, if a first time sequence of a first set of data (e.g., GPS trajectory data) is inconsistent with a second time sequence of a second set of data (e.g., a velocity data of the autonomous vehicle), a portion of the first set of data or the second set of data that are inconsistent in time may be determined as invalid. In some embodiments, the processing device(s) 112 may determine a validity of the initial data based on an identifier thereof. For example, if the initial data includes an identifier indicating the initial data being abnormal data, the processing device(s) 112 may determine the initial data to be invalid.

The filtering the initial data may include removing or deleting all or a part of the initial data that is verified to be invalid. In some embodiments, the filtering the initial data may also include filtering noises in the initial data (e.g., a noise in image data). In some embodiments, the processing device(s) 112 may filter the initial data based on a filtering algorithm (e.g., a Kalman Filtering algorithm, an Extended Kalman Filtering algorithm, a Limiting Filter algorithm, a Median Filtering algorithm, an Arithmetic Average Filtering algorithm, a Recursive Mean Filtering algorithm, a Median Value Average Filtering algorithm, a Limited Average Filtering algorithm, a First Order Lag Filtering algorithm, a Weighted Recursive Mean Filter, a Noise Elimination Filter algorithm, a Amplitude Limited Noise Elimination Filter algorithm, a Collaborative Filtering algorithm, etc.).

The segmenting the initial data may include divide the initial data into a plurality of data segments for facilitating a user (e.g., an engineer) to retrieve and/or download the data. In some embodiments, the processing device(s) 112 may segment the initial data based on one or more preset rules. For example, the processing device(s) 112 may segment the initial data based on a rule associated with time and/or size such that each data segment of the initial data may correspond to a limited time period (e.g., 20 s) and/or a limited size (e.g., 600 M). In some embodiments, the preprocessing device(s) 112 may determine importance degrees (and/or hot degrees) (e.g., a high importance degree, a medium importance degree, a low importance degree, etc.) for a plurality of data sets of the initial data. In some embodiments, the preprocessing device(s) 112 may determine the importance degrees based on one or more preset rules, the number of accesses of data, the use of the data, or the like, or a combination thereof. In some embodiments, the processing device(s) 112 may segment the data with a relatively high importance degree in the preprocessing process. In some embodiments, the processing device(s) 112 may not segment the data with a relatively low importance degree in the preprocessing process temporarily. In some embodiments, the processing device(s) 112 may segment the data with a relatively low importance degree in response to a request of a user (e.g., an engineer). In some embodiments, the importance degrees of the initial data may vary in different situations. For example, the initial data may have a relatively high importance degree during a first time period (e.g., during a development project), while the initial data may have a relatively low importance degree during a second time period (e.g., after the development project is finished).

In some embodiments, the processing device(s) 112 may preprocess the initial data based on a task queue. A task queue (also referred to as a job queue) may refer to a data structure containing jobs/tasks to run. The task queue may be maintained by a job/task scheduler software. The task queue may include one or more tasks. A task may refer to a program execution context. A task may indicate what kind or which part of initial data is to be preprocessed, what preprocessing operation(s) are to be performed on the data, information relating to storage paths of the corresponding data to be preprocessed, or the like, or any combination thereof. In some embodiments, the task queue may be a distributed task queue. In some embodiments, the processing device(s) 112 may preprocess the initial data based on the distributed task queue asynchronously. For example, a plurality of processing devices 112 may perform the same preprocessing operation(s) on one or more data sets of the initial data separately and/or concurrently based on the task queue. As another example, a plurality of processing devices 112 may perform different preprocessing operations on one or more data sets of the initial data separately and/or concurrently based on the task queue. In some embodiments, the tasks in the task queue may have priority information, and the processing device(s) 112 may execute the tasks according to the priority information of the tasks. For example, the processing device(s) 112 may determine which task is to be executed first currently. More descriptions of the preprocessing of the initial data based on the task queue may be found elsewhere in the present disclosure (e.g., in FIGS. 6, 7 and 9 and the descriptions thereof).

In 503, the processing device(s) 112 (e.g., the storing module 410) may store the preprocessed data.

In some embodiments, the processing device(s) 112 may store, by one or more proxies, the preprocessed data into the one or more storage devices (e.g., the storage device 140, a HDFS operated by the storage device 140) of the data processing system 100. In some embodiments, the processing device(s) 112 may preprocess different initial data stored in different storage devices of the data processing system 100, respectively, and obtain corresponding preprocessed data. In some embodiments, the processing device(s) 112 may store the corresponding preprocessed data back into corresponding storage devices that the different initial data is stored. More descriptions of the storing of the preprocessed data may be found elsewhere in the present disclosure (e.g., in FIGS. 6, 7 and 9 and the descriptions thereof).

In 505, the processing device(s) 112 (e.g., the transmitting module 408) may receive a data request made through an application. In some embodiments, the data request may include information relating to a storage path of contents that are requested. The contents may be part of the initial data and/or the preprocessed data. In some embodiments, the data request may include a description of the contents that are requested. In some embodiments, the description of the contents may indicate which type of data is requested, a size of the requested data, mean(s) of creation of the requested data, a time and/or date of creation, a creator or author of the requested data, a location on a computer network where the requested data was created, a data quality of the requested data, or the like, or a combination thereof.

As used herein, the application may include an interface of the data processing system 100. The application may facilitate data access in the data processing system 100 for one or more users. User(s) can access the data processing system 100 through the interface. In some embodiments, the application may be installed in the terminal device 130. A user (e.g., an engineer) may log in the application through the interface. The login user may initiate the data request by, for example, selecting or confirming one or more options (e.g., action button(s), function menu(s), or the like), or inputting descriptions (e.g., types, names, sizes, or the like) of contents that are requested on the interface of the application. In some embodiments, the application may determine a storage path of contents that are requested based on the descriptions of the contents.

In some embodiments, the application may generate a uniform resource identifier (URI) (e.g., a uniform resource locator (URL)) based on the data request. The URL may include an Internet protocol (IP) address of the login user, descriptions of the contents requested, information relating to the storage path of contents that are requested, or the like, or any combination thereof. In some embodiments, the application may provide the URL to the login user in response to the data request. In some embodiments, if the login user clicks the URL, the processing device(s) 112 may receive the data request from the application, and the processing device(s) 112 may invoke a nearby proxy based on the IP address of the login user. In some embodiments, if the login user clicks the URL, the application may directly invoke a nearby proxy based on the IP address of the login user. The nearby proxy may receive the data request, and determine information associated with the contents that are requested by resolving the URL.

In 507, in response to the data request, the processing device(s) 112 (e.g., the determining module 406) may determine, e.g., by a nearby proxy, whether the contents requested in the data request are cached locally (e.g., in a server of the nearby proxy or servers of a proxy cluster (e.g., a first proxy cluster illustrated elsewhere in the present disclosure) that the nearby proxy belongs to). In response to a determination that the contents requested in the data request are cached locally, process 500 may proceed to 511. Alternatively, in response to a determination that the contents requested in the data request are not cached locally, process 500 may proceed to 509.

In some embodiments, the nearby proxy may be determined based on the URL generated by the application. If the login user clicks the URL, the application may invoke the nearby proxy. In some embodiments, if the IP address indicates that the login user is located in a first region, then the nearby proxy may be a proxy of a first proxy cluster in the first region. In some embodiments, the distance between a location of a server coupled to the nearby proxy and a location of the terminal device 130 associated with the login user (also referred to as a user location) may be less than the distances between servers coupled to the other proxies in the first proxy cluster (and/or other proxy clusters (if any) in the first region) and the user location. For example, the application may determine the user location based on the IP address of the login user. The application may determine the first region based on user location. If the user location is in country A, the application may determine whether country A include more than one proxy cluster. In response to a determination that country A includes only one proxy cluster, the application may designate the only one proxy cluster as the first proxy cluster, and determine a proxy that has a minimum distance from the user location in the first proxy cluster as the nearby proxy. In response to a determination that country A includes more than one proxy cluster, the application may designate a proxy cluster in the same district of country A as the user location as the first proxy cluster, and determine a proxy that has a minimum distance from the user location in the first proxy cluster as the nearby proxy.

In some embodiments, the nearby proxy may determine information (e.g., types, names, storage paths, sizes, or the like) associated with the contents requested in the data request by resolving the URL. The nearby proxy may determine whether the contents requested in the data request are cached locally (e.g., in the server of the nearby proxy or servers of a proxy cluster (e.g., the first proxy cluster) that the nearby proxy belongs to) based on the information. For example, the nearby proxy may search the contents requested in the data request locally based on the types, names, and/or sizes. If the contents requested in the data request are not found, the nearby proxy may determine that the contents requested in the data request are not cached locally. If the contents requested in the data request are found, the nearby proxy may determine that the contents requested in the data request are cached locally.

In 509, the processing device(s) 112 (e.g., the acquisition module 402) may acquire, by the nearby proxy, the contents based on the information relating to the storage path of the contents.

In some embodiments, the processing device(s) 112 may determine, by the nearby proxy, whether the storage path of the contents directs to a second region. The second region may be different country from the first region or be different district from the first region in a same country. In response to a determination that the storage path of the contents directs to the second region, the processing device(s) 112 may request, by the nearby proxy, a second proxy cluster (or one or more proxies in the second proxy cluster) in the second region to return the contents. The second proxy cluster may acquire the contents from storage device(s) in the second region and return the contents to the nearby proxy. In some embodiments, the processing device(s) 112 may cache, by the nearby proxy, the contents returned by the second proxy cluster locally (e.g., in a server of the nearby proxy or servers of a proxy cluster that the nearby proxy belongs to). In response to a determination that the storage path of the contents does not direct to a second region (e.g., directing to the first region), the processing device(s) 112 may acquire, by the nearby proxy, the contents from storage device(s) in the first region. In some embodiments, the nearby proxy may request another proxy (e.g., a proxy in another proxy cluster) in the first region to return the contents. The processing device(s) 112 may cache, by the nearby proxy, the acquired contents locally (e.g., in a server of the nearby proxy or servers of a proxy cluster that the nearby proxy belongs to).

In some embodiments, the processing device(s) 112 may determine, by the nearby proxy, whether the contents requested in the data request are hot data. In some embodiments, the processing device(s) 112 may cache the contents in one or more servers coupled to other proxies in one or more proxy clusters in one or more regions based on a hot degree of the contents. More descriptions of the caching of the contents may be found elsewhere in the present disclosure (e.g., FIG. 8 and the descriptions thereof).

In 511, the processing device(s) 112 (e.g., the transmitting module 408) may provide, by the nearby proxy, the contents to the application. The login user may access or download the contents through the application. In some embodiments, a process for caching the contents locally (e.g., in a server of the nearby proxy or servers of a proxy cluster that the nearby proxy belongs to) by the nearby proxy and a process for downloading the contents by the login user may be conducted synchronously or sequentially. In some embodiments, if the contents are cached locally, a downloading speed of the contents may be relatively fast. If the contents are not cached locally, a downloading speed of the contents may be relatively slow. By catching the contents locally, the downloading speed of the contents may be improved.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added elsewhere in the process 500. For example, an operation for obtaining, by one or more proxies, the initial data from the one or more storage devices of the data processing system 100 may be added before operation 501. As another example, an operation for determining hot preprocessed data and caching hot preprocessed data in one or more servers coupled to one or more proxies of one or more proxy clusters in one or more regions may be added after operation 503. As still another example, an operation for determining the nearby proxy may be added after operation 505. As still another example, an operation for sending a message to inform the user that the downloading of the requested contents is finished may be added after operation 511. More descriptions of the optional operations may be found elsewhere in the present disclosure (e.g., FIGS. 6-9, and descriptions thereof).

Figure 6:
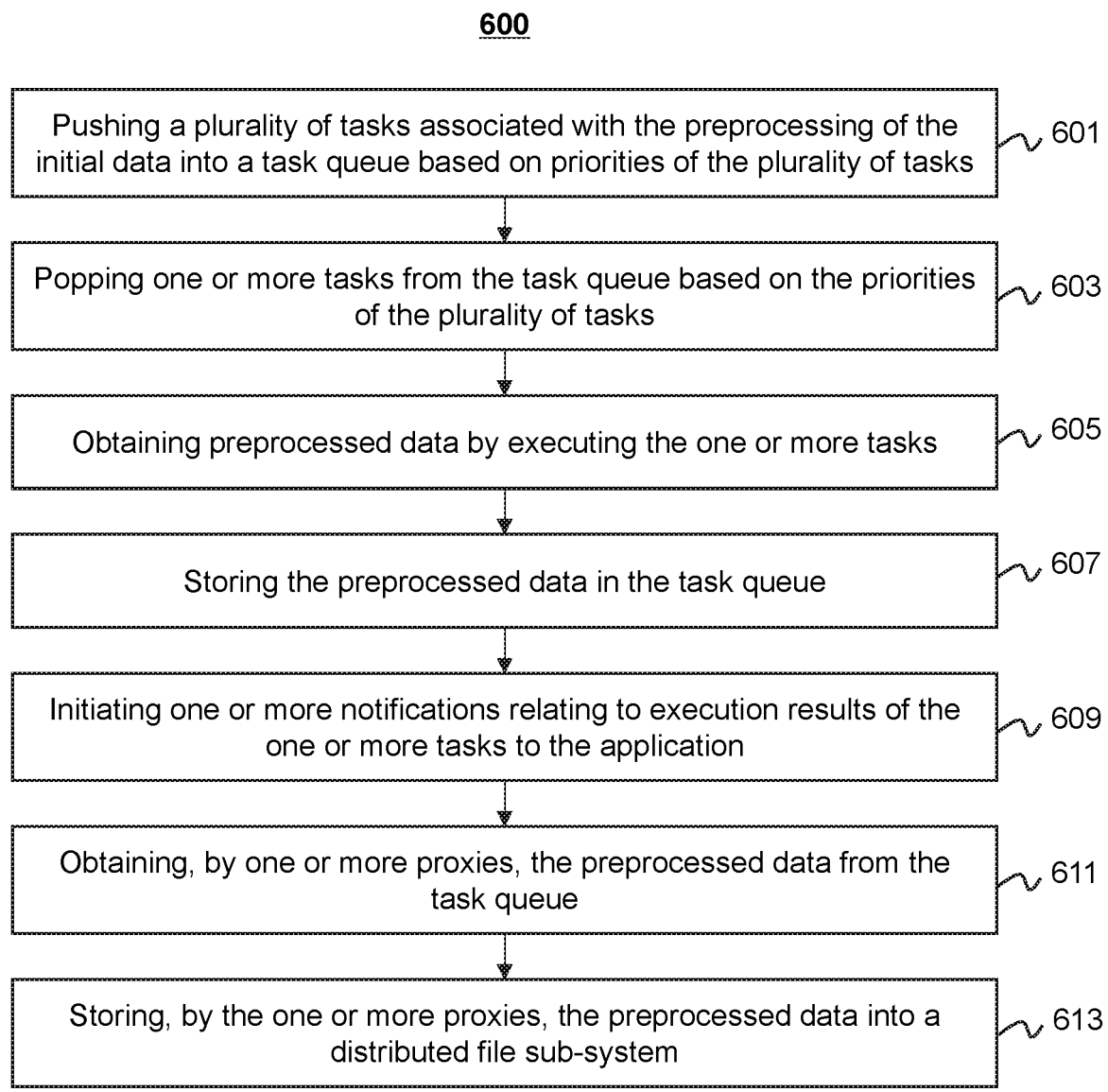
FIG. 6 is a flowchart illustrating an exemplary process for preprocessing initial data and storing preprocessed data according to some embodiments of the present disclosure.

FIG. 6 is a flowchart illustrating an exemplary process for preprocessing initial data and storing preprocessed data according to some embodiments of the present disclosure. The process 600 may be executed by the data processing system 100. For example, the process 600 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 illustrated in FIG. 6 and described below is not intended to be limiting. In some embodiments, operations 501 and 503 illustrated in FIG. 5 may be performed according to the process 600.

In 601, the processing device(s) 112 (e.g., the preprocessing module 404) may push a plurality of tasks associated with the preprocessing of the initial data into a task queue based on priorities of the plurality of tasks. In some embodiments, the processing device(s) 112 may generate the tasks based on a plurality of preprocessing operations (e.g., compressing, verifying, filtering, segmenting, or the like, or operations requested by a user, as illustrated in FIG. 5) and the initial data to be preprocessed. For example, the processing device(s) 112 may generate a first task for filtering a first data set of the initial data, a second task for segmenting the first data set of the initial data, a third task for filtering a second data set of the initial data, a fourth task for segmenting the second data set of the initial data, etc. In some embodiments, each task may have a priority. In some embodiments, the processing device(s) 112 may determine the priorities of the tasks based on one or more preset rules. For example, a task for preprocessing data initiated directly by an operator (e.g., an engineer) may have a relatively high priority, and a task for preprocessing data associated with non-urgent use (e.g., simulation and/or regression test) may have a relatively low priority. In some embodiments, the priorities of the plurality of tasks may be set by an operator (e.g., an engineer) or a default setting of the data processing system 100, and/or may be adjustable in different situations.

In some embodiments, the processing device(s) 112 may push the plurality of tasks into the task queue based on the priorities of the tasks. For example, the processing device(s) 112 may push a task with a relatively high priority into the task queue first. In some embodiments, the task queue may be a distributed task queue operated by a plurality of servers. In this case, the processing device(s) 112 may evaluate the computing resources of the servers and determine which server to push which task.

In 603, the processing device(s) 112 (e.g., the preprocessing module 404) may pop one or more tasks from the task queue based on the priorities of the plurality of tasks. In some embodiments, the processing device(s) 112 may determine the one or more tasks (e.g., a count of the one or more tasks) based on a count of servers or processing engines that are available to execute the tasks (also referred to as available servers). For example, if the count of the available servers is N, the processing device(s) 112 may pop N tasks from the task queue based on priorities of the plurality of tasks. In some embodiments, the N available servers may execute the N tasks separately. If one or more servers (e.g., M servers) of the N available servers finish corresponding M tasks, the M servers become available again. The processing device(s) 112 may further pop M tasks from the task queue based on the priorities of the plurality of tasks. As illustrated herein, N and M are integers. In some embodiments, the processing device(s) 112 may evaluate the computing resources of the servers and determine which server to pop which task to.

In 605, the processing device(s) 112 (e.g., the preprocessing module 404) may obtain preprocessed data by executing the one or more tasks. In some embodiments, the processing device(s) 112 may obtain the data to be processed by the task(s) and execute the task(s). More descriptions of the execution of the tasks may be found elsewhere in the present disclosure (e.g., FIGS. 7 and 9 and descriptions thereof).

In 607, the processing device(s) 112 (e.g., the preprocessing module 404) may store the preprocessed data in the task queue. In some embodiments, the processing device(s) 112 may store the preprocessed data in the task queue based on the priorities of the tasks or the execution sequence of the tasks.

In 609, the processing device(s) 112 (e.g., the preprocessing module 404) may initiate one or more notifications relating to execution results of the one or more tasks to the application (e.g., the application illustrated in FIG. 5). The execution results of the tasks may include successes or failures of the execution of the tasks, finishing time of the tasks, locations (e.g., priorities) of the preprocessed data in the task queue, or the like, or any combination thereof. In some embodiments, the processing device(s) 112 may initial the one or more notifications based on time points when the one or more tasks are finished. For example, if the one or more tasks are finished in different time points, the processing device(s) 112 may initiate the one or more notifications in different time points once the one or more tasks are finished. An operator (e.g., an engineer) may review the execution results of the tasks via the application. If one or more tasks are executed unsuccessfully or abnormally, the operator may carry out corresponding inspections, take corresponding measures, etc.

In 611, the processing device(s) 112 (e.g., the storing module 410) may obtain, by one or more proxies, the preprocessed data from the task queue. In some embodiments, the one or more proxies may obtain the preprocessed data from the task queue in real time or periodically. For example, the proxies may obtain the preprocessed data from the task queue once the preprocessed data is stored in the task queue. As another example, the proxies may obtain the preprocessed data from the task queue at regular intervals (e.g., every 5 s or 10 s), or when a predetermined size of the preprocessed data (e.g., 10 M preprocessed data) is stored in the task queue.

In 613, the processing device(s) 112 (e.g., the storing module 410) may store, by the one or more proxies, the preprocessed data into a distributed file sub-system. In some embodiments, the distributed file sub-system may include a Hadoop Distributed File System (HDFS), a Network File System (NFS), a KASS File System (KASS), an Andrew File System (AFS), or the like, or any combination thereof. Taking the distributed file sub-system of the HDFS as an example, the initial data corresponding to the preprocessed data may be stored in the HDFS. The processing device(s) 112 may store the preprocessed data back into the HDFS. After storing the preprocessed data, the corresponding initial data may be retained, deleted, or transferred to another storage device according to different situations. For example, the initial data corresponding to the preprocessed data may not be stored in the HDFS and may be stored in another distributed file sub-system (e.g., an NFS) of the data processing system 100.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added elsewhere in the process 600. For example, an operation for determining a count of available servers may be added before operation 603. As another example, operations 603 and 605 may be integrated in a single operation.

Figure 7:
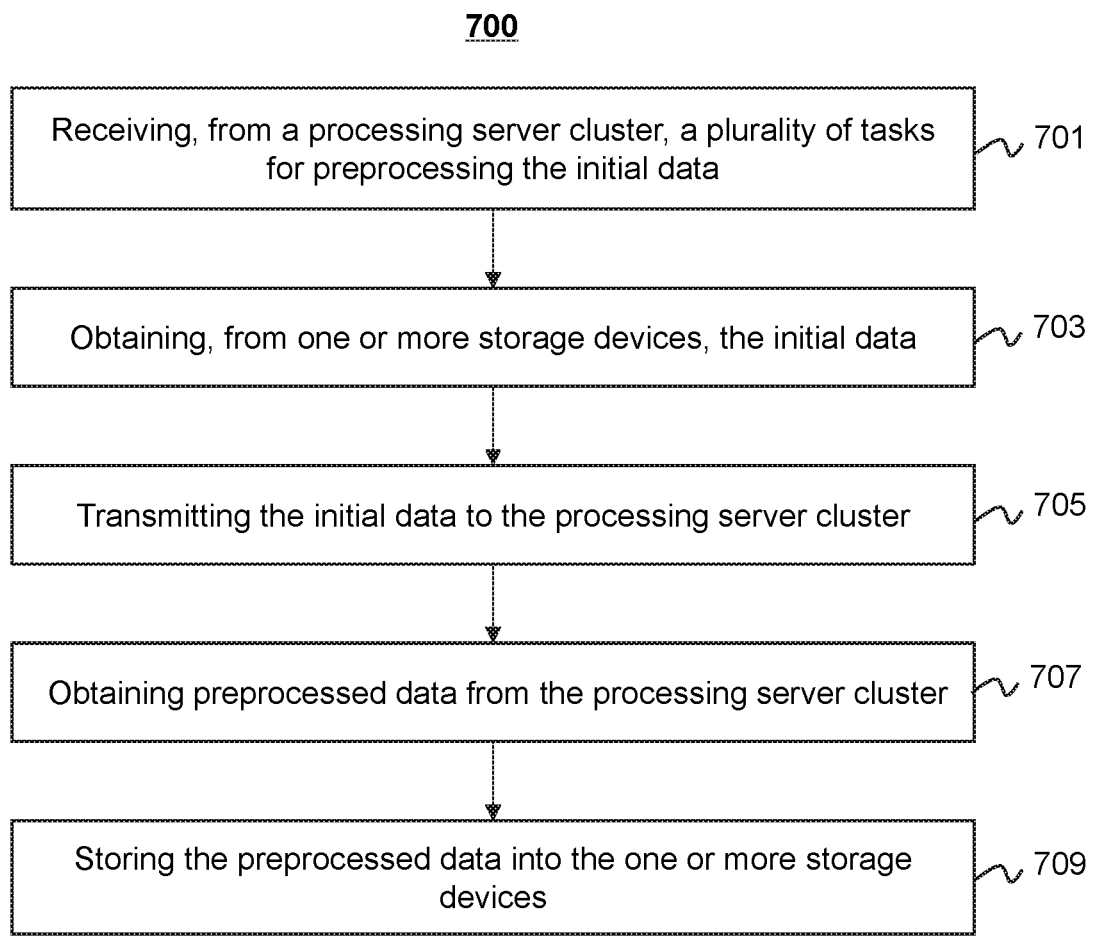
FIG. 7 is a flowchart illustrating an exemplary process for preprocessing the initial data according to some embodiments of the present disclosure.

FIG. 7 is a flowchart illustrating an exemplary process for preprocessing the initial data according to some embodiments of the present disclosure. The process 700 may be executed by a proxy server cluster (also referred to as a proxy cluster) of the data processing system 100. As used herein, the proxy cluster may include one or more servers 110 coupled to one or more proxies that can acquire and/or store data and/information from/into a database operated by one or more storage devices of the data processing system 100. The operations of the illustrated process presented below are intended to be illustrative. In some embodiments, the process 700 may be accomplished with one or more additional operations not described and/or without one or more of the operations discussed. Additionally, the order in which the operations of the process 700 illustrated in FIG. 7 and described below is not intended to be limiting.

In 701, the proxy server cluster (e.g., one or more servers of the proxy server cluster) may receive, from a processing server cluster (e.g., a preprocessing server cluster described in FIG. 1), a plurality of tasks for preprocessing the initial data. In some embodiments, the plurality of tasks for preprocessing the initial data may have priorities, as described in FIG. 6. The preprocessing server cluster may include one or more servers for performing functions of preprocessing the initial data. The functions of preprocessing the initial data may be similar to the descriptions of operation 501 in FIG. 5 and operations 601-609 in FIG. 6.

In 703, the proxy server cluster (e.g., one or more servers of the proxy server cluster) may obtain, from one or more storage devices (e.g., the storage device 140, a HDFS operated by the storage device 140), the initial data. In some embodiments, the tasks may include information relating to the storage paths of corresponding initial data to be preprocessed, and thus, the proxy cluster may obtain the initial data based on the storage paths.

In 705, the proxy server cluster (e.g., one or more servers of the proxy server cluster) may transmit the initial data to the preprocessing server cluster. In some embodiments, the proxy cluster may transmit the initial data to one or more servers of the preprocessing server cluster based on the tasks. For example, each task of the plurality of tasks may be executed on a server of the preprocessing server cluster, and the proxy cluster may transmit corresponding initial data in the each task to a corresponding server of the preprocessing server cluster. In some embodiments, upon receiving the initial data, the preprocessing server cluster may execute the tasks, generate preprocessed data, and/or store the preprocessed data in the task queue, as illustrated in operations 605 and 607 in FIG. 6.

In 707, the proxy server cluster (e.g., one or more servers of the proxy server cluster) may obtain preprocessed data from the preprocessing server cluster. In some embodiments, the proxy server cluster may obtain the preprocessed data from the task queue. More descriptions of the obtaining of the preprocessed data from the task queue may be found elsewhere in the present disclosure (e.g., operation 611 of FIG. 6 and descriptions thereof).

In 709, the proxy server cluster (e.g., one or more servers of the proxy server cluster) may store the preprocessed data into the one or more storage devices. In some embodiments, the preprocessed data and the initial data may be stored in the same or different storage devices. For example, the proxy cluster may store the preprocessed data back into the one or more storage where the initial data is stored. As another example, the proxy cluster may store the preprocessed data into one or more storage devices that are different from the one or more storage devices where the initial data is stored. More descriptions of the storing of the preprocessed data may be found elsewhere in the present disclosure (e.g., operation 613 of FIG. 6 and descriptions thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be performed by the proxy server cluster in 700. For example, an operation for determining hot data may be added after operation 709, which may be found elsewhere in the present disclosure (e.g., operation 801 in FIG. 8, and descriptions thereof).

Figure 8:
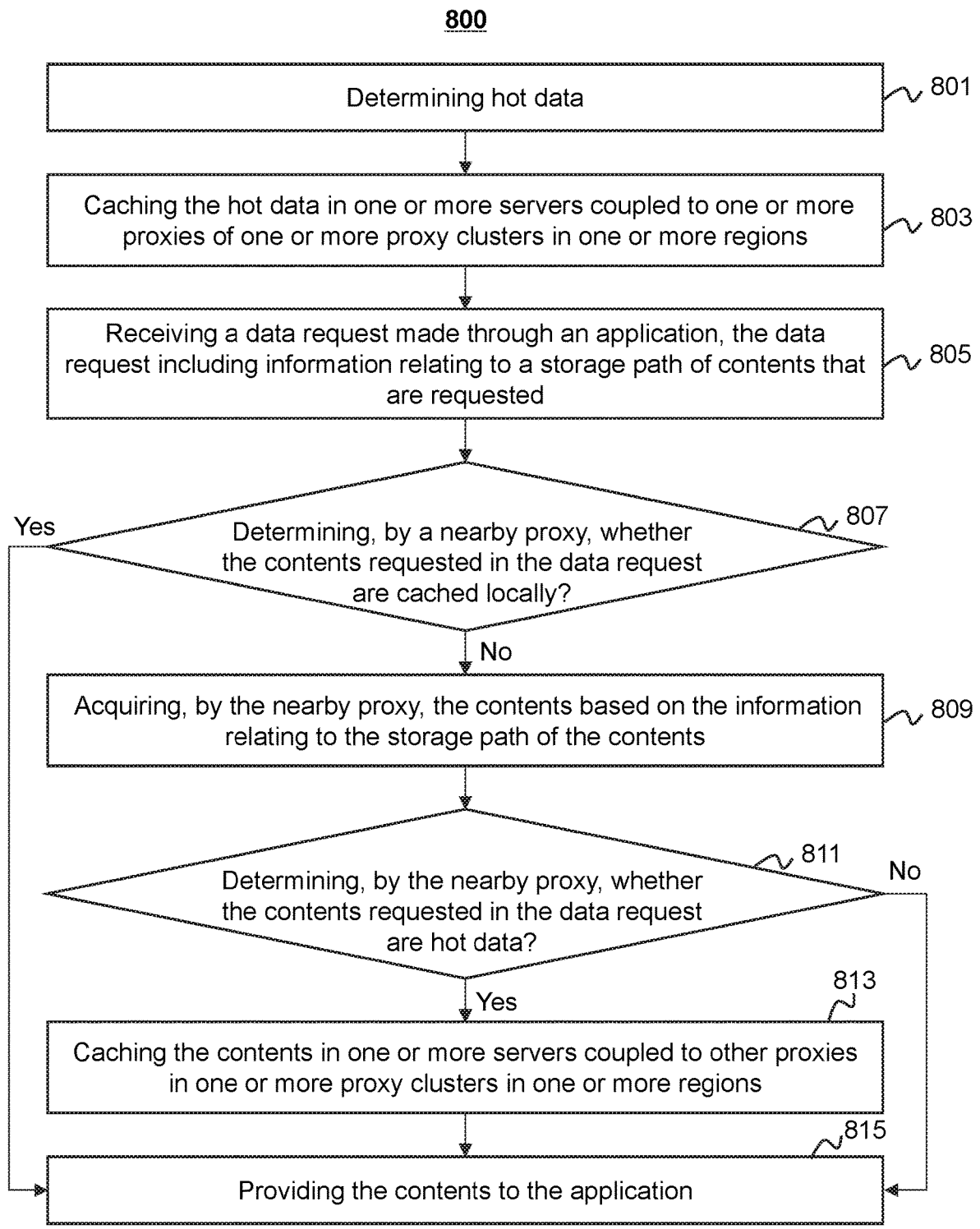
FIG. 8 is a flowchart illustrating an exemplary process for providing contents to an application in response to a data request according to some embodiments of the present disclosure.

FIG. 8 is a flowchart illustrating an exemplary process for providing contents to an application in response to a data request according to some embodiments of the present disclosure. The process 800 may be executed by a proxy server cluster of the data processing system 100. As used herein, the proxy server cluster may include one or more servers 110 coupled to one or more proxies that can acquire data and/information from one or more storage devices of the data processing system 100, and/or cache or provide the data/information for users of the application. The operations of the illustrated process presented below are intended to be illustrative. In some embodiments, the process 800 may be accomplished with one or more additional operations not described and/or without one or more of the operations discussed. Additionally, the order in which the operations of the process 800 illustrated in FIG. 8 and described below is not intended to be limiting.

In 801, the proxy server cluster (e.g., one or more servers of the proxy server cluster) may determine hot data. The hot data may refer to data that is requested by users frequently (e.g., retrieved or downloaded more than a threshold count of times). In some embodiments, the hot data may be set by an operator or a default setting of the data processing system 100, or may be adjustable in different situations.

In some embodiments, the proxy cluster may determine hot data based on historical request records of data (e.g., the initial data or the preprocessed data stored in storage devices (e.g., the storage device 140, or a HDFS operated by the storage device 140) of the data processing system 100 as described in FIGS. 5-7. For example, the proxy cluster may determine data that has a historical request times more than a threshold count of times as the hot data. In some embodiments, the proxy cluster may determine the hot data based on a setting of an operator (e.g., an engineer) of the data processing system 100. The operator may adjust the criteria of the hot data based on different situations (e.g., different requirements of the operator or different purposes of the hot data) through the application.

In some embodiments, the hot data may have a hot degree. If the hot data have a relatively high hot degree, the frequency in which the hot data is requested may be relatively high. In some embodiments, the hot degrees of hot data may include top hot, medium hot, non-hot, etc.

In 803, the proxy server cluster (e.g., one or more servers of the proxy server cluster) may cache the hot data in one or more servers coupled to one or more proxies of one or more proxy clusters in one or more regions.

In some embodiments, the proxy cluster may perform the caching based on the hot degree of the hot data. Merely by way of example, top hot data may be cached in a first count of servers, medium hot data may be cached in a second count of servers, while non-hot data may not be cached. The first count may be greater than the second count. As another example, the proxy cluster may cache the top hot data in the servers coupled to all proxies of all proxy clusters in all regions. As a further example, the proxy cluster may cache the medium hot data in a portion of the servers coupled to proxies of proxy clusters in all regions, servers coupled to proxies of proxy clusters in a specific region, servers coupled to proxies of a specific cluster in a specific region, etc.

In 805, the proxy server cluster (e.g., one or more servers of the proxy server cluster) may receive a data request made through an application. More descriptions of the data request and the receiving of the data request may be found elsewhere in the present disclosure (e.g., operation 505 in FIG. 5 and descriptions thereof).

In 807, the proxy server cluster (e.g., one or more servers of the proxy server cluster) may determine, by a nearby proxy, whether the contents requested in the data request are cached locally (e.g., in a server of the nearby proxy or servers of a proxy cluster (e.g., the first proxy cluster) that the nearby proxy belongs to). In response to a determination that the contents requested in the data request are cached locally, process 800 may proceed to 815. Alternatively, in response to a determination that the contents requested in the data request are not cached locally, process 800 may proceed to 809. More descriptions of the nearby proxy and the determination of whether the contents requested are cached locally may be found elsewhere in the present disclosure (e.g., operation 507 in FIG. 5 and the descriptions thereof).

In 809, the proxy server cluster (e.g., one or more servers of the proxy server cluster) may acquire, by the nearby proxy, the contents based on the information relating to the storage path of the contents. More descriptions of the acquisition of the contents may be found elsewhere in the present disclosure (e.g., operation 509 in FIG. 5 and the descriptions thereof).

In 811, the proxy server cluster (e.g., one or more servers of the proxy server cluster) may determine, by the nearby proxy, whether the contents requested in the data request are hot data. In some embodiments, the proxy cluster may determine, by the nearby proxy, whether the contents requested in the data request are hot data similarly to operation 801. In response to a determination that the contents requested in the data request are hot data, the process 800 may proceed to operation 813. In response to a determination that the contents requested in the data request are not hot data, process 800 may proceed to operation 815.

In 813, the proxy server cluster (e.g., one or more servers of the proxy server cluster) may cache the contents in one or more servers coupled to other proxies in one or more proxy clusters in one or more regions. For example, the proxy cluster may cache the contents (with a medium hot degree) in one or more servers coupled to other proxies in the first proxy cluster in the first region. As another example, the proxy cluster may cache the contents (with a medium hot degree) in one or more servers coupled to other proxies in a second proxy cluster in the first region and/or in the second region. As a further example, the proxy cluster may cache the contents (with a top hot degree) in all servers coupled to other proxies in all proxy clusters in all regions.

In 815, the proxy server cluster (e.g., one or more servers of the proxy server cluster) may provide the contents to the application. More descriptions of the providing of the contents to the application may be found elsewhere in the present disclosure (e.g., operation 511 in FIG. 5 and the descriptions thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be performed by the proxy server cluster in 800. For example, an operation for determining the nearby proxy may be added after operation 805.

Figure 9:
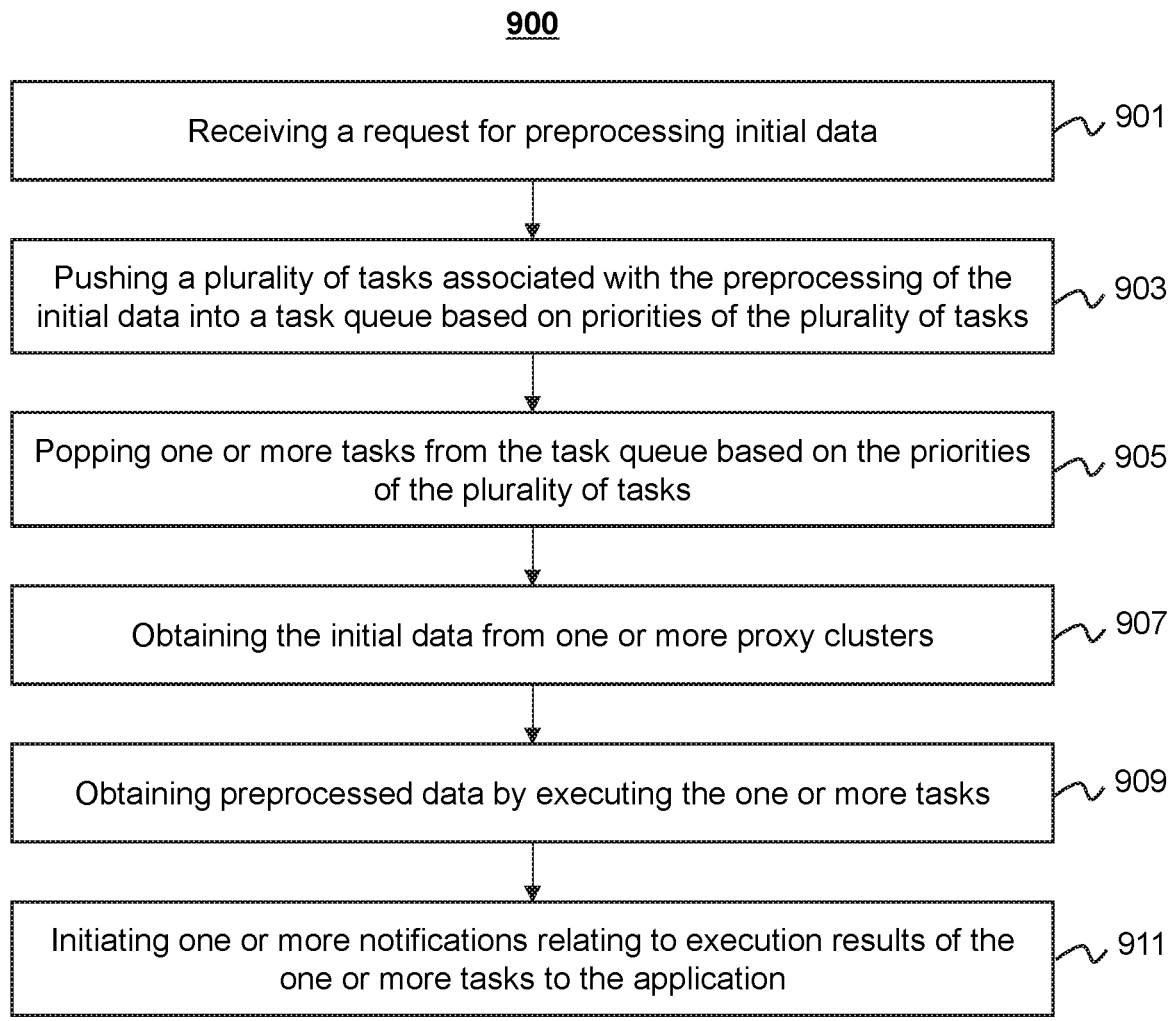
FIG. 9 is a flowchart illustrating an exemplary process for preprocessing initial data according to some embodiments of the present disclosure.

FIG. 9 is a flowchart illustrating an exemplary process for preprocessing initial data according to some embodiments of the present disclosure. The process 900 may be executed by a preprocessing server cluster. As used herein, the preprocessing server cluster may include one or more servers 110 for preprocessing the initial data. The operations of the illustrated process presented below are intended to be illustrative. In some embodiments, the process 900 may be accomplished with one or more additional operations not described and/or without one or more of the operations discussed. Additionally, the order in which the operations of the process 900 illustrated in FIG. 9 and described below is not intended to be limiting.

In 901, the preprocessing server cluster (e.g., one or more servers of the preprocessing server cluster) may receive a request for preprocessing initial data.

In some embodiments, the request may include information of a plurality of tasks associated with the preprocessing of the initial data. The tasks may include priority information, similar to the descriptions of operation 601 in FIG. 6. In some embodiments, the request may be set by an operator (e.g., an engineer) or a default setting of the data processing system 100, and/or may be adjustable in different situations.

In some embodiments, the preprocessing server cluster may receive the request from one or more components of the data processing system 100. For example, the preprocessing server cluster may receive the request from one or more other servers of the data processing system 100 automatically when the initial data is stored in a storage device (e.g., the storage device 140, a HDFS operated by the storage device 140) of the data processing system 100. As another example, the preprocessing server cluster may receive the request from an application associated with the data processing system 100 when a user (e.g., an engineer) logs in the application and initiate a preprocessing request.

In 903, the preprocessing server cluster (e.g., one or more servers of the preprocessing server cluster) may push a plurality of tasks associated with the preprocessing of the initial data into a task queue based on priorities of the plurality of tasks. More descriptions of the task queue and the pushing operation may be found elsewhere in the present disclosure (e.g., operation 501 in FIG. 5, operation 601 in FIG. 6 and descriptions thereof).

In 905, the preprocessing server cluster (e.g., one or more servers of the preprocessing server cluster) may pop one or more tasks from the task queue based on the priorities of the plurality of tasks. More descriptions of the popping operation may be found elsewhere in the present disclosure (e.g., operation 603 in FIG. 6 and descriptions thereof).

In 907, the preprocessing server cluster (e.g., one or more servers of the preprocessing server cluster) may obtain the initial data from one or more proxy clusters.

In some embodiments, the preprocessing server cluster may communicate with one or more proxies of one or more proxy clusters in one or more regions. In some embodiments, the preprocessing server cluster may invoke one or more proxies to obtain the initial data. In some embodiments, the proxies may determine storage paths of the initial data based on the tasks. In some embodiments, the proxies may obtain the initial data based on the storage paths from one or more storage devices (e.g., the storage device 140, a HDFS operated by the storage device 140) of the data processing system 100. In some embodiments, the proxies may transmit the initial data to the preprocessing server cluster, and the preprocessing server cluster may then obtain the initial data from the proxies. In some embodiments, the proxies may store the initial data in a memory or a cache, and the preprocessing server cluster may then obtain the initial data from the memory or the cache.

In 909, the preprocessing server cluster (e.g., one or more servers of the preprocessing server cluster) may obtain preprocessed data by executing the one or more tasks. More descriptions of the obtaining of the preprocessed data may be found elsewhere in the present disclosure (e.g., operation 605 in FIG. 6 and descriptions thereof).

In 911, the preprocessing server cluster (e.g., one or more servers of the preprocessing server cluster) may initiate one or more notifications relating to execution results of the one or more tasks to the application. More descriptions of the initiating of the notifications may be found elsewhere in the present disclosure (e.g., operation 609 in FIG. 6 and descriptions thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be performed by the preprocessing server cluster in 900. For example, after operation 909, the preprocessing server cluster may store the preprocessed data into the task queue. Thus, one or more proxy clusters may obtain the preprocessed data from the task queue for further storage.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for data processing, comprising:
preprocessing initial data to obtain preprocessed data;
storing the preprocessed data;
receiving a data request made by a login user through an application, the data request including information relating to a storage path of contents that are requested, wherein the contents are part of the preprocessed data;
in response to the data request, determining, by a nearby proxy of a first proxy cluster in a first region, whether the contents requested in the data request are cached locally in a server of the nearby proxy or in servers of the first proxy cluster, wherein the nearby proxy is a proxy in the first proxy cluster and has a minimum distance from a location of the login user; and
in response to a determination that the contents are cached locally in the server of the nearby proxy or in the servers of the first proxy cluster, providing, by the nearby proxy, the contents to the application; or
in response to a determination that the contents are not cached locally in the server of the nearby proxy or in the servers of the first proxy cluster, acquiring, by the nearby proxy, the contents based on the information relating to the storage path of the contents; and providing, by the nearby proxy, the contents to the application.

2. The method of claim 1, wherein in response to a determination that the contents are not cached locally, the method further comprises:

determining, by the nearby proxy, whether the contents requested in the data request are hot data; and in response to a determination that the contents are hot data, caching the contents in one or more servers coupled to other proxies of the first proxy cluster.

3. The method of claim 1, wherein in response to a determination that the contents are not cached locally, the method further comprises:

determining, by the nearby proxy, whether the contents requested in the data request are hot data; and in response to a determination that the contents are hot data, caching the content in one or more servers coupled to other proxies of a second proxy cluster in the first region and/or in a second region.

4. The method of claim 1, wherein acquiring, by the nearby proxy, the contents based on the information relating to the storage path of the contents comprises:

upon the storage path of the content directing to a second region, requesting, by the nearby proxy, the second proxy cluster in the second region to return the contents; and caching, by the nearby proxy, the contents locally in the server of the nearby proxy or in the servers of the first proxy cluster.

5. The method of claim 1, further comprising:

caching hot preprocessed data in one or more servers coupled to one or more proxies of one or more proxy clusters.

6. The method of claim 1, wherein the preprocessing initial data to obtain preprocessed data comprises:

preprocessing the initial data stored in a distributed file sub-system.

7. The method of claim 6, wherein the distributed file sub-system is a Hadoop distributed file system (HDFS).

8. The method of claim 1, wherein the preprocessing initial data to obtain preprocessed data comprises:

preprocessing the initial data based on a task queue.

9. The method of claim 8, wherein the task queue is a distributed task queue.

10. The method of claim 8, wherein the preprocessing the initial data based on a task queue comprises:

pushing a plurality of tasks associated with the preprocessing of the initial data into the task queue based on priorities of the plurality of tasks;

popping one or more tasks from the task queue based on the priorities of the plurality of tasks; and obtaining preprocessed data by executing the one or more tasks.

11. The method of claim 10, wherein the preprocessing the initial data based on a task queue further comprises:

initiating one or more notifications relating to execution results of the one or more tasks to the application.

12. The method of claim 10, wherein the preprocessing the initial data based on a task queue further comprises:

storing the preprocessed data in the task queue.

13. The method of claim 12, wherein the storing the preprocessed data comprises:

obtaining, by one or more proxies, the preprocessed data from the task queue; and storing, by the one or more proxies, the preprocessed data into a distributed file sub-system.

14. The method of claim 1, wherein the preprocessing of the initial data includes at least one of verifying a validity of the initial data, filtering the initial data, segmenting the initial data, or compressing the initial data.

15. The method of claim 1, further comprising:

determining the nearby proxy of the first proxy cluster in the first region based on the data request.

16. A system for data processing, comprising:

at least one storage medium including a set of instructions; and at least one processor in communication with the at least one storage medium, wherein when executing the set of instructions, the at least one processor is configured to cause the system to perform operations including:

preprocessing initial data to obtain preprocessed data;

storing the preprocessed data;

receiving a data request made by a login user through an application, the data request including information relating to a storage path of contents that are requested, wherein the contents are part of the preprocessed data;

in response to the data request, determining, by a nearby proxy of a first proxy cluster in a first region, whether the contents requested in the data request are cached locally in a server of the nearby proxy or in servers of the first proxy cluster, wherein the nearby proxy is a proxy in the first proxy cluster and has a minimum distance from a location of the login user; and in response to a determination that the contents are cached locally in the server of the nearby proxy or in the servers of the first proxy cluster, providing, by the nearby proxy, the contents to the application; or in response to a determination that the contents are not cached locally in the server of the nearby proxy or in the servers of the first proxy cluster, acquiring, by the nearby proxy, the contents based on the information relating to the storage path of the contents; and providing, by the nearby proxy, the contents to the application.

17. The system of claim 16, wherein in response to a determination that the contents are not cached locally, the at least one processor is further configured to cause the system to perform the operations including:

determining, by the nearby proxy, whether the contents requested in the data request are hot data; and in response to a determination that the contents are hot data, caching the contents in one or more servers coupled to other proxies of the first proxy cluster.

18. The system of claim 16, wherein in response to a determination that the contents are not cached locally, the at least one processor is further configured to cause the system to perform the operations including:

determining, by the nearby proxy, whether the contents requested in the data request are hot data; and in response to a determination that the contents are hot data, caching the content in one or more servers coupled to other proxies of a second proxy cluster in the first region and/or in a second region.

19. A non-transitory computer readable medium, comprising at least one set of instructions for data processing, wherein when executed by one or more processors of a computing device, the at least one set of instructions causes the computing device to perform a method, the method comprising:
   causing a plurality of servers to preprocess initial data to obtain preprocessed data;
   causing one or more proxies in one or more proxy clusters to store the preprocessed data;
   receiving a data request made by a login user through an application, the data request including information relating to a storage path of contents that are requested, wherein the contents are part of the preprocessed data;
   in response to the data request,
      determining a nearby proxy of a first proxy cluster of the one or more proxy clusters based on the data request, wherein the nearby proxy is a proxy in the first proxy cluster and has a minimum distance from a location of the login user;
      causing the nearby proxy to determine whether the contents requested in the data request are cached locally in a server of the nearby proxy or in servers of the first proxy cluster; and
      in response to a determination that the contents are cached locally in the server of the nearby proxy or in the servers of the first proxy cluster, causing the nearby proxy to provide the contents to the application; or
      in response to a determination that the contents are not cached locally in the server of the nearby proxy or in the servers of the first proxy cluster,
         causing the nearby proxy to acquire the contents based on the information relating to the storage path of the contents; and
         causing the nearby proxy to provide the contents to the application.

20. The system of claim 16, wherein to acquire, by the nearby proxy, the contents based on the information relating to the storage path of the contents, the at least one processor is configured to cause the system to perform operations including:
   upon the storage path of the content directing to a second region,
      requesting, by the nearby proxy, the second proxy cluster in the second region to return the contents; and
      caching, by the nearby proxy, the contents locally in the server of the nearby proxy or in the servers of the first proxy cluster.

* * * * *